United States Patent [19]
Chen

[11] Patent Number: 5,794,191
[45] Date of Patent: Aug. 11, 1998

[54] NEURAL NETWORK BASED SPEECH RECOGNITION METHOD UTILIZING SPECTRUM-DEPENDENT AND TIME-DEPENDENT COEFFICIENTS

[75] Inventor: Wen-Yuan Chen, Hsinchu, Taiwan

[73] Assignee: Industrial Technology Research Institute, Hsinchu, Taiwan

[21] Appl. No.: 685,331

[22] Filed: Jul. 23, 1996

[51] Int. Cl.$^6$ ........................................ G10L 9/00
[52] U.S. Cl. ............................... 704/232; 704/236
[58] Field of Search ....................... 395/2.41, 2.68, 395/2.11, 2.4, 2.6, 2.09, 22, 21, 23, 24; 704/236

[56] References Cited

U.S. PATENT DOCUMENTS

| | | | |
|---|---|---|---|
| 5,285,522 | 2/1994 | Mueller | 704/232 |
| 5,481,644 | 1/1996 | Inazumi | 704/232 |

OTHER PUBLICATIONS

Pao-Chung Chang, San-Wei Sun, and Sin-Horng Chen, "Mandarin Tone Recognition by Multi-Layer Perceptron," ICASSP 90, 3–6 Apr. 1990.
W.-Y. Chen and S.-H. Chen, "Speaker-Independent Mandarin Plosive Recognition with Dynamic Features and Multilayer Perceptrons," Electronic Letters 31(4), 16 Feb. 1995.
S.-H. Hwang and S.-H. Chen, "Neural-Network-Based F0 Text-to-Speech Synthesizer for Mandarin," IEE Proc.–Vis. Image Signal Process., 141(6), Dec. 1994.
S., Chang and S.-H. Chen, "Isolated Mandarin Syllable Recognition Using Segmental features," IEE Proc.–Vis. Image Signal Process., 142(1), Feb. 1995.
Lawrence Rabiner and Biing-Hwang Juang, Fundamentals of Speech Recognition, (Prentice–Hall, Inc. Englewood Cliffs, NJ, 1993) pp. 54–89, Dec. 1993.

Primary Examiner—David R. Hudspeth
Assistant Examiner—Donald L. Storm
Attorney, Agent, or Firm—W. Wayne Liauh

[57] ABSTRACT

An improved artificial neural network for use in speech recognition is disclosed. It comprises an input layer, a hidden layer, and an output layer, each of these layers consisting of a plurality of nodal points. A set of first weighting coefficients are used between the input layer and the hidden layer which are functions of at least one of the nodal points in the hidden layer and at least one of the nodal points in the input layer; whereas, a set of second weighting coefficients, which are functions of time and at least one of the nodal points in the output, are used to correlate between the hidden layer and output layer. In a preferred embodiment, the first weighting coefficients are calculated using the following formula:

$$w_j^I[i] = \frac{c_j}{\sqrt{2\pi}\, b_j} e^{-\frac{1}{2}(\frac{i-a_j}{b_j})^2}$$

i is the index for nodal point in the input layer and $a_j$, $b_j$, and $c_j$ are all training coefficients associated with nodal point j in the hidden layer; and the second weighting coefficients are calculated using the following formula:

$$w_{jk}^{II}\left[\frac{n}{N}\right] = \sum_{m=0}^{r} \alpha_{jkm} \phi_m\left(\frac{n}{N}\right)$$

n is the timeframe number, r is the order of an orthogonal polynomial series ($\psi$, 60 $_{jkm}$ is the m-th order training coefficient between nodal points j and k, in the hidden and output layers, respectively. The use of the two different sets of weighting coefficients allows a timeframe-based division of the speech signals, resulting in a substantial reduction of parameters required for accurate speech recognition.

16 Claims, 6 Drawing Sheets

NEURAL NETWORK BASED SPEECH RECOGNITION METHOD UTILIZING SPECTRUM-DEPENDENT AND TIME-DEPENDENT COEFFICIENTS

FIELD OF THE INVETION

The present invention relates to an improved speech recognition method and apparatus utilizing an artificial neutral network. More specifically, the present invention relates to an improved neural-network-based speech recognition method, and an apparatus incorporating the same, which utilizes a novel approach to reduce the number of network parameters required for accurate speech recognition. The method and apparatus disclosed in the present invention can be most advantageously used in making toys or other small-vocabulary systems, which must pare the hardware expenses in order to keep their prices at an affordable level.

BACKGROUND OF THE INVENTION

Artificial neural network has been widely used in speech recognitions. Most of the speech recognition methods taught in the art that utilize artificial neural network involve a large number of network parameters including characteristic parameters. Thus, these systems can only be used in relatively complicated devices which can be quite expensive. Based on the conventional approach, reducing the number of parameters would substantially reduce the speech recognition accuracy, and is thus highly undesirable.

In U.S. Pat. No. 5,228,087, the content thereof is incorporated by reference, it is disclosed a speech recognition method which is carried by performing a first analysis of a speech signal using a Hidden Markov Model and an asymmetric time warping algorithm. A second analysis is performed using Multi-Layer Perception techniques in conjunction with a neural network.

Other prior art references that taught the use of neural network for speech recognition include: U.S. Pat. Nos. 5,278,911, 5,285,522, 5,255,342, 5,179,624, 5,377,302, 5,185,848, 5,293,454, 5,404,422, 5,410,635, 5,426,745, 5,457,770, 5,471,557; Statutory Publication H1415; Taiwan Pat. No. 178275. Neural-network-based speech recognition method were also discussed in a number of publications, including: "Speaker Independent Word Recognition Using Dynamic Programming Neural Network," by H. Sake, R. Isotani, K. Yoshida, K. Iso, and T. Watanabe, Proc. IEEE Int'l Conf. Acoust. Speech, Signal Process. (ICASSP), pp. 29–32 (1989); "A Time Delay Neural Network Architecture for Isolated Word Recognition," by K. J. Lang and A. H. Waibel, Neural Network, Vol. 3, pp.23–43 (1990); "Phoneme Discrimination Using Connectionist Networks," by R. L. Watrous, J. of the Acoustical Society of America, Vol. 87, pp. 1753–1771 (1990); and "Connectionist Probability Estimators In HMM Speech Recognition," by S. Renal, N. Morgan, H. Bourlard, M. Cohen, and H. Franco, IEEE Trans. on Speech and Audio Processing, Vol. 2, pp. 161–174 (1994). The contents of these references are explicitly incorporated herein by reference.

In all the artificial neural network methods discussed above, the weighting factors, or weighting coefficients, between the neural layers are constant. All these neural network methods require the participation of all nodal points from the same layer in performing the calculations in order to achieve satisfactory speech recognition rates. This results in a large number of total neural parameters that will need to be included in the calculations, and, consequently, the requirement of large hardware resources. As a result, the devices incorporating these methods are all relatively expensive and cannot be used in simple applications.

SUMMARY OF THE INVETION

The primary object of the present invention is to develop an improved speech recognition method and apparatus utilizing artificial neural network. More specifically, the primary object of the present invention is to develop an artificial-neural-network-based speech recognition method and apparatus, which provide improved speech recognition rate but require reduced hardware resources, by reducing the number of the neural parameters that will be required to achieve same or even improved speech recognition accuracy. The method and apparatus disclosed in the present invention are most advantageous for use in toys or other simple systems with a small vocabulary, wherein the hardware expenses must be kept at a minimum.

In the method disclosed in the present invention, the neural network comprises three layers: an input layer, an output layer, and a hidden layer between the input layer and the output layer. Input speech signals are first divided into a plurality of timeframes and each timeframe is processed through a plurality of bandpass filters to obtain a set of parameters representing the characteristics of the speech signal at that timeframe. These parameters are called characteristic parameters. After further processing, these parameters are then recognized via the artificial neural network disclosed in the present invention. One of the key elements of the present invention is that the weighting coefficients between the nodal points of the input layer and those of the hidden layer are made to be a function of the frequency spectrum of the input speech signal, and that the weighting coefficients between the nodal points of the hidden layer and those of the output layer are made to be a function of time. The present invention also discloses a very simple approach, by which these weighting coefficients can be modified to produce more accurate results with minimum increase in CPU time but a reduction in required hardware resources.

The method disclosed in the present invention can be summarized as comprising the following steps:

(a) dividing the input speech signal into N timeframes;

(b) processing input speech data in each timeframe, n, through a set of bandpass filters having B number of channels to obtain B number of characteristic parameters, represented as $x_1 \ldots X_B$, for each timeframe; and (c) processing the B number of characteristic parameters in an artificial neural network.

The artificial neural network of the present invention comprises an input layer, a hidden layer, and an output layer. During a timeframe n, the output from the j-th nodal point in the hidden layer, $Y_n[j]$, is calculated according to the following formulas:

$$Y_n[j] = \text{sigmoid}\left( \sum_{i=1}^{B} x_i w_j'[i] + \theta_j \right) \quad \text{Eqn. (1):}$$

$$w_j'[i] = \frac{c_j}{\sqrt{2\pi}\ b_j} e^{-\frac{1}{2}\left(\frac{i-a_j}{b_j}\right)^2} \quad \text{Eqn. (2):}$$

$$\text{sigmoid}(x) = \frac{1}{1+e^{-x}} \quad \text{Eqn. (3):}$$

In Eqns. (1) and (2), $\theta_j$, $a_j$, $b_j$, and $c_j$ are training coefficients associated with nodal j.

On the other hand, the output from the k-th nodal point in the output layer, $Z_n[k]$, is calculated according to the following formulas:

$$Z_n[k] = \text{sigmoid}\left(\sum_{j=1}^{H} Y_n[j] w_{jk}^{II}\left[\frac{n}{N}\right]\right) \quad \text{Eqn. (4):}$$

$$w_{jk}^{II}\left[\frac{n}{N}\right] = \sum_{m=0}^{r} \alpha_{jkm} \phi_m\left(\frac{n}{N}\right) \quad \text{Eqn. (5):}$$

In Eqn. (4), H is the number of nodal points in the hidden layer. In Eqn. (5), r is the order of an orthogonal polynomial series $\phi$. $\alpha_{jkm}$ is the m-th order coefficient between nodal points j and k (which is a parameter to be trained). For many of the cases investigated in the present invention, a second order polynomial is adequate, and, under this situation, the term $\phi_m(n/N)(m=0-2)$ in Eqn. (5) can be rewritten, according to a preferred embodiment, as:

$$\phi_0\left(\frac{n}{N}\right) = 1 \quad \text{Eqn. (6):}$$

$$\phi_1\left(\frac{n}{N}\right) = \left[\frac{12N}{N+2}\right]^{1/2} \left[\frac{n}{N} - \frac{1}{2}\right] \quad \text{Eqn. (7):}$$

$$\phi_2\left(\frac{n}{N}\right) = \quad \text{Eqn. (8):}$$

$$\left[\frac{180N^3}{(N-1)(N+2)(N+3)}\right]^{1/2} \left[\left(\frac{n}{N}\right)^2 - \frac{n}{N} + \frac{N-1}{6N}\right]$$

Every nodal point k in the output layer represents a reference vocabulary, indicated as G[k]. To find the best recognized result, the calculated values at each nodal point in the output layer are summed over the entire timeframes, i.e., $$G[k] = \sum_{n=1}^{N} Z_n[k] \quad \text{Eqn. (9):}$$

The vocabulary represented by the nodal point with the largest output value, as calculated from Eqn. (9), is accepted as the recognized result.

In the method disclosed in the present invention, the coefficients 0 (in Eqn. 1), a, b, c (in Eqn. 2) and $\alpha$ (in Eqn. 5) can be obtained using a variety of training techniques. In a preferred embodiment, a generalized probabilistic descent algorithm is utilized. Other techniques may also be utilized.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

The present invention discloses an improved speech recognition method and apparatus utilizing artificial neural network which provide improved recognition rates but require reduced hardware resources by reducing the number of neural network parameters required to achieve the same or even better speech recognition accuracy. The method and apparatus disclosed in the present invention are most advantageous for use in toys or other small-vocabulary systems, where cost of the components must be kept at a minimum.

Figure 1:
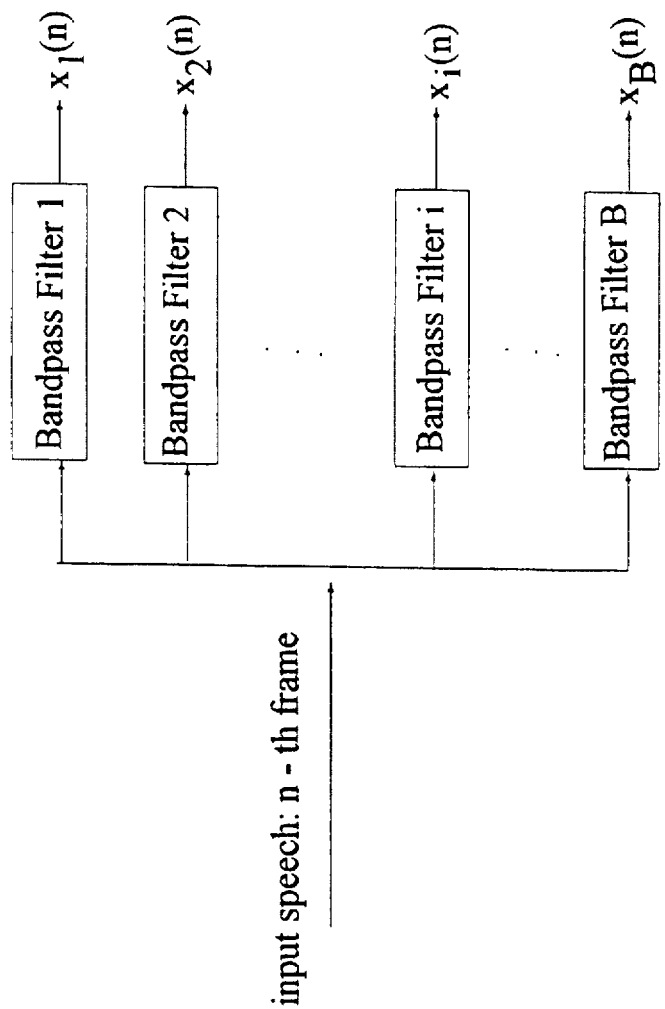
FIG. 1 is a schematic diagram shown that input speech signal is divided into N timeframes, each timeframe, n, is processed through a set of bandpass filters to obtain B characteristic parameters, $X_I, \ldots, X_B$.
Figure 2:
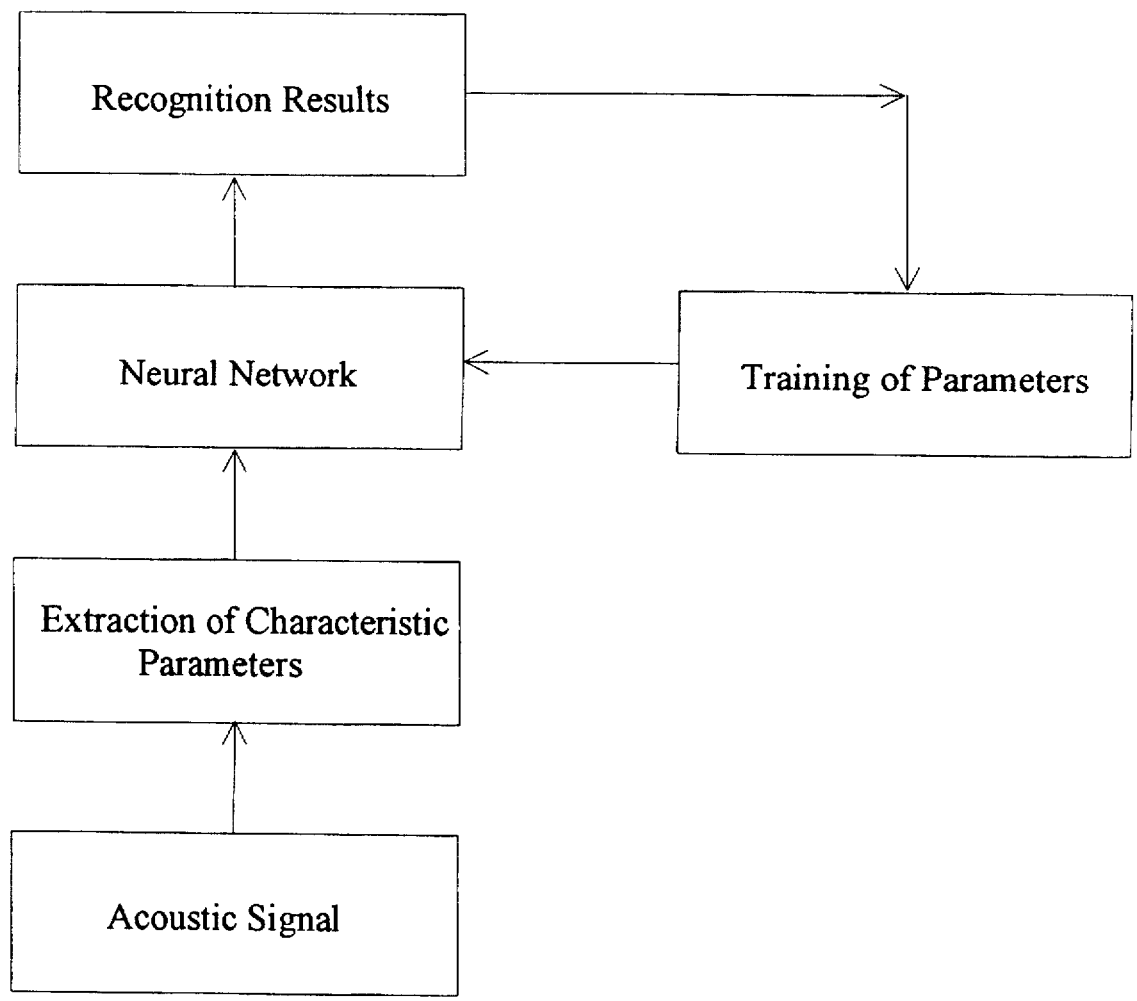
FIG. 2 is a schematic flowchart illustrating the steps of the speech recognition process of the present invention.

FIGS. 1 and 2 are two schematic flowcharts illustrating the steps of the speech recognition method of the present invention. In the first step as shown in FIG. 1, the input speech signal is divided into N timeframes. For each timeframe n, the input speech signal is processed through a set of bandpass filters. For each timeframe, B characteristic parameters, $x_I, \ldots, X_B$, are obtained from the frequency spectrum.

As shown in FIG. 2, in the second step, the characteristic parameters are fed into a neural network. The neural network comprises three layers: an input layer1, an output layer 2, and a hidden layer 3 between the input layer and the output layer. As we all know, sound is produced as the lung forces air through a sequence of speech organs such as throat, tongue, teeth, oral cavity, larynx, etc. Thus there should exist a relationship, which may be relatively complicated, that can describe the speech signal as a function of time. Furthermore, because a speech requires coordinated actions of the various speech organs, the energies associated with the various frequency bands should also be related to each other, as evidenced from the energy-frequency plot. These relationships are typically represented by Gaussian function(s) based on established speech synthesis theories. In the past, the complicated relationship between speech signals and time, and among the various frequency bands of the speech signal, are masked by including a large number of input parameters in the training process. This has necessitated a relatively large hardware requirement and rendered speech recognition devices relatively expensive.

Figure 3:
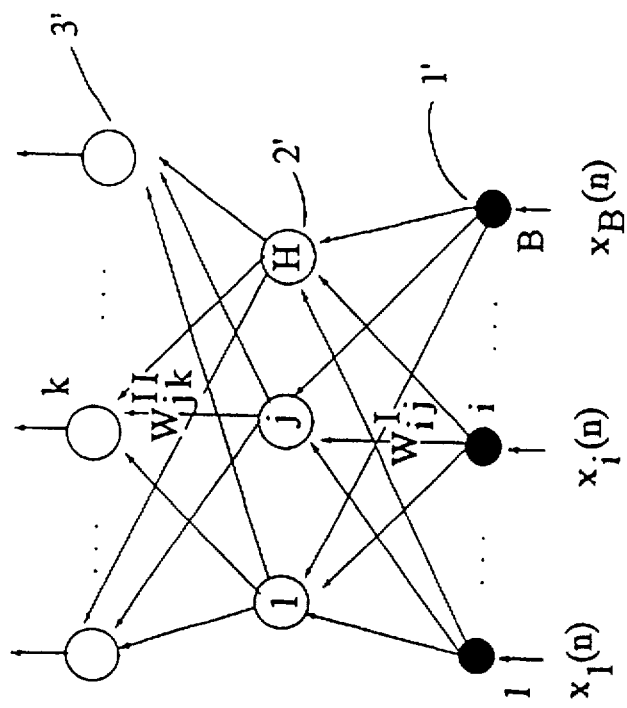
FIG. 3 is a schematic diagram showing the conventional artificial neural network disclosed in the prior art methods for speech recognition.
Figure 4:
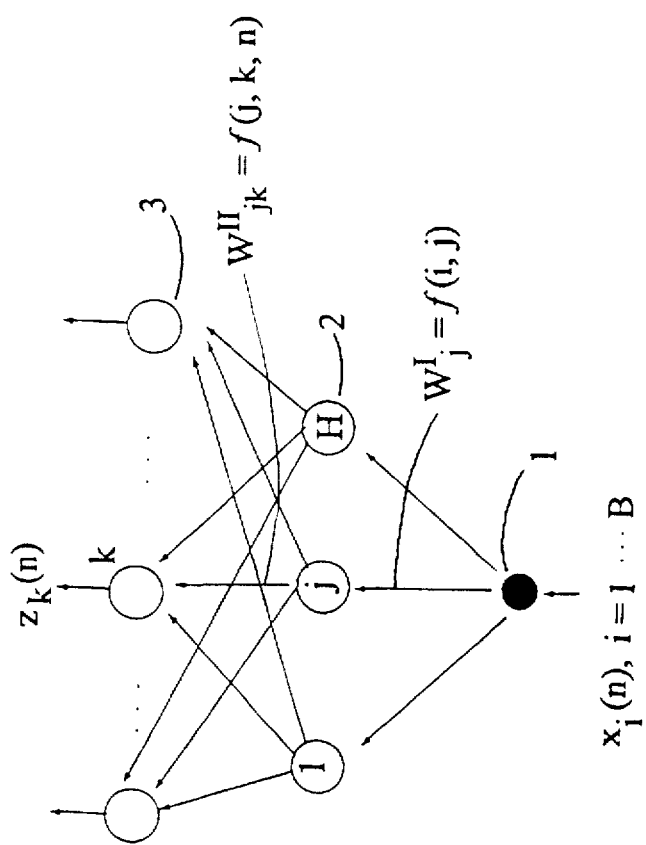
FIG. 4 is a schematic diagram showing the artificial neural network for speech recognition according to a preferred embodiment of the present invention.

FIG. 3 is a schematic diagram of the conventional artificial neural network disclosed in the prior art methods for speech recognition. On comparison, FIG. 4 is a schematic diagram of the artificial neural network for speech recognition disclosed in the present invention. One of the key elements of the present invention is that the weighting coefficients between nodal points of the input layer and those of the hidden layer are made to be a function of the frequency spectrum of the input speech signal, and that the weighting coefficients between nodal points of the hidden layer and those of the output layer are made to be a function of time. The present invention also discloses a very simple approach, by which these weighting coefficients can be modified to produce more accuracy results with minimum increase in CPU time. As shown in FIG. 3, the weighting coefficients between the nodal points in the input layer 1' and the hidden layer 2', in the conventional approach, are constant. FIG. 3 further shows that the weighting coefficients between the nodal points in the hidden layer 2' and the output layer 3' are also constant.

With the method disclosed in the present invention, as shown in FIG. 4, the first weighting coefficient, W' (between the input layer and the hidden layer) and the second weighting coefficient, w''.(between the hidden layer and the output layer) are functions of speech spectrum and time, respectively. Eqn. 2 shows that the first weighting coefficient between nodal points i (of the input layer) and j (of the hidden layer) $w_j'[i]$ is a function of both i and j.

$$w_j'[i] = \frac{c_j}{\sqrt{2\pi}\ b_j} e^{-\frac{1}{2}(\frac{i-a_j}{b_j})^2},$$

and the second weighting coefficient between nodal points j and k (of the output layer) $w_{jk}''[n]$ is also function of time n;

$$w_{jk}''\left[\frac{n}{N}\right] = \sum_{m=0}^{r} \alpha_{jkm}\phi_m\left(\frac{n}{N}\right).$$

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

Example 1: Establishing a Neural Network

An artificial neural network was established which comprised an input layer, a hidden layer, and an output layer. During a timeframe n, the output from the j-th nodal point in the hidden layer, $Y_n[j]$, was calculated according to the following formulas;

Calculations Between Input Layer and Hidden Layer:

$$Y_n[j] = \text{sigmoid}\left(\sum_{i=1}^{B} x_i w_j'[i] + \theta_j\right) \quad \text{Eqn. (1):}$$

$$w_j'[i] = \frac{c_j}{\sqrt{2\pi}\ b_j} e^{-\frac{1}{2}(\frac{i-a_j}{b_j})^2} \quad \text{Eqn. (2):}$$

$$\text{sigmoid}(x) = \frac{1}{1+e^{-x}} \quad \text{Eqn. (3):}$$

The output from the k-th nodal point in the output layer, $Z_n[k]$, was calculated according to the following formulas:

Calculations Between Hidden Layer and Output Layer $$Z_n[k] = \text{sigmoid}\left(\sum_{j=1}^{H} Y_n[j]w_{jk}''\left[\frac{n}{N}\right]\right) \quad \text{Eqn. (4):}$$

$$w_{jk}''\left[\frac{n}{N}\right] = \sum_{m=0}^{r} \alpha_{jkm}\phi_m\left(\frac{n}{N}\right) \quad \text{Eqn. (5):}$$

In Eqn. (4), H is the number of nodal points in the hidden layer. In Eqn. (5), r is the order of an orthogonal polynomial series $\phi$. $\alpha_{jkm}$ is the m-th order coefficient between nodal points j and k (which is a parameter to be trained). In a preferred embodiment, r=2, i.e., $\phi$ is a second order orthogonal polynomial and the term $\phi_m(n/N)(m=0\sim2)$ in Eqn. (5) became:

$$\phi_0\left(\frac{n}{N}\right) = 1 \quad \text{Eqn. (6):}$$

-continued $$\phi_1\left(\frac{n}{N}\right) = \left[\frac{12N}{N+2}\right]^{1/2}\left[\frac{n}{N} - \frac{1}{2}\right] \quad \text{Eqn. (7):}$$

$$\phi_2\left(\frac{n}{N}\right) = \quad \text{Eqn. (8):}$$

$$\left[\frac{180N^3}{(N-1)(N+2)(N+3)}\right]^{1/2}\left[\left(\frac{n}{N}\right)^2 - \frac{n}{N} + \frac{N-1}{6N}\right]$$

Calculating Outputs from the Neural Network

Every nodal point k in the output layer represents a reference vocabulary, indicated as $G[k]$. The output from each nodal point in the output layer was calculated by a summation of all the output values over the entire timeframes, i.e., $$G[k] = \sum_{n=1}^{N} Z_n[k] \quad \text{Eqn. (9):}$$

Obtaining Recognized Result

The vocabulary represented by the nodal point with the largest output value, as calculated from Eqn. (9), is accepted as the recognized result.

Training of Parameters

Figure 5:
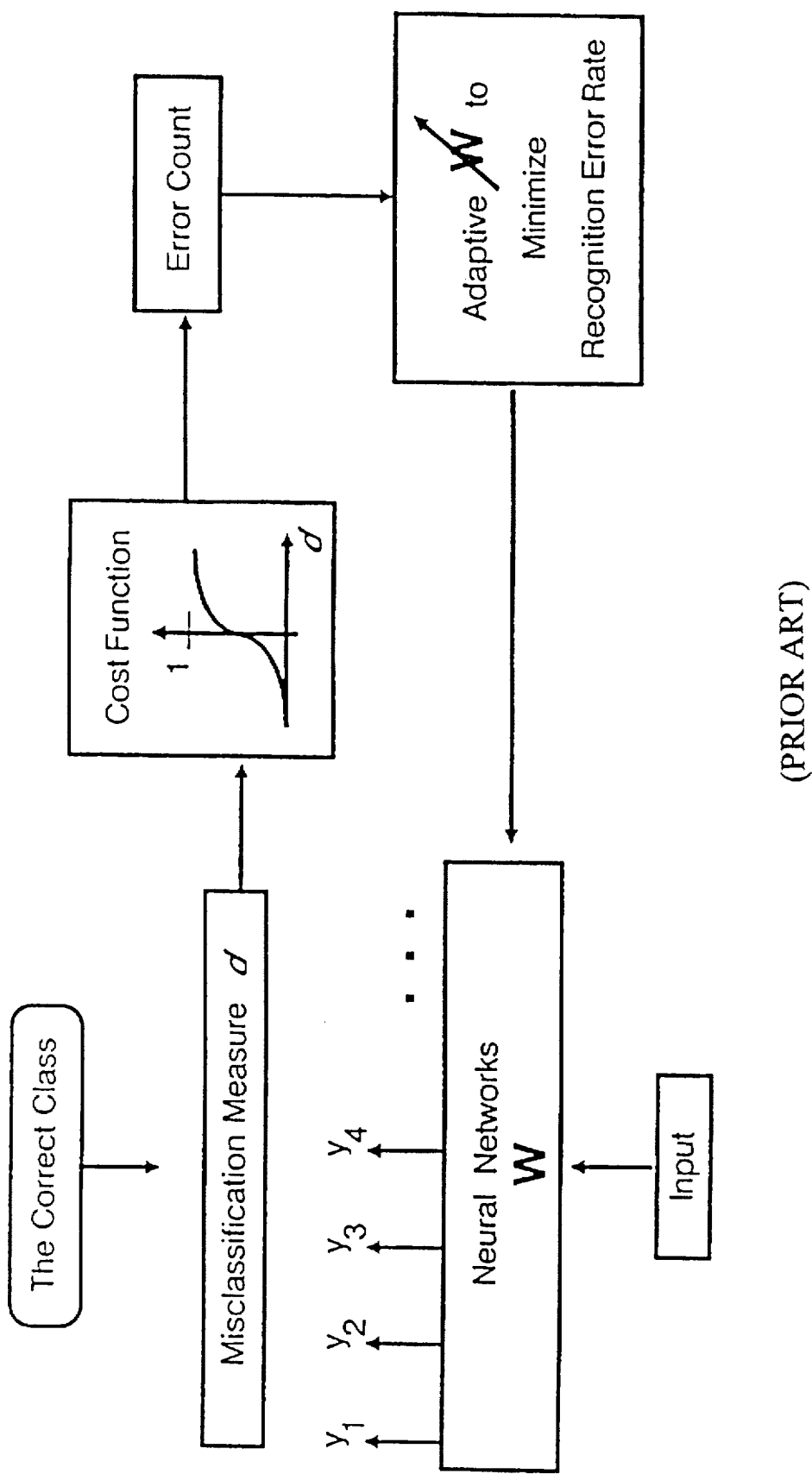
FIG. 5 shows a simplified flowchart diagram of the generalized probabilistic descent (GPD) algorithm.

The coefficients $\theta$ (in Eqn 1), a, b, c (in Eqn. 2) and $\alpha$ (in Eqn. 5) were obtained using a generalized probabilistic descent (GPD) algorithm. FIG. 5 shows a simplified flowchart diagram of this algorithm. Detailed of this algorithm can be found in "New Discriminative Training Algorithms Based on the Generalized Probabilistic Descent Method," by S. Katagiri, C. H. Lee, and B. H. Juang, Proc. IEEE Neural Networks for Signal Process, pp. 299–308 (1991), the content thereof is incorporated by reference.

Speech Recognition Experiment 1

Figure 6:
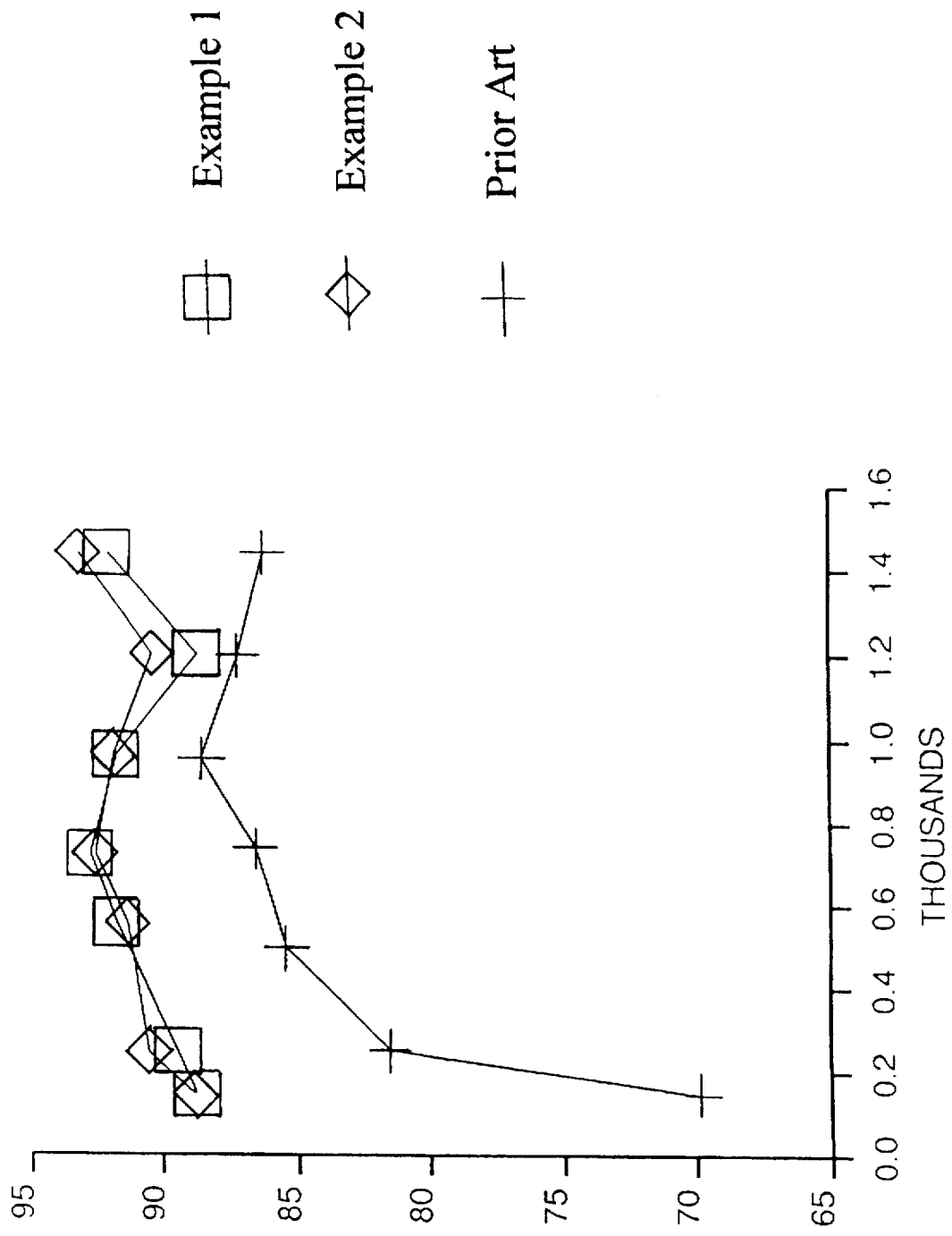
FIG. 6 shows plots of recognition rates (y-axis) vs. number of parameters (x-axis) for two preferred embodiments of the present invention relative to a prior art method.

The above neural network was used in a speech recognition experiment. The database was constructed by 100 persons who pronounced Mandarin digits twice, one was used for training purposes and the other for speech recognition. In Experiment 1, the speech signal in each timeframe was processed to produce 16 characteristic parameters, and all the 16 characteristic parameters, $x_1, \ldots, X_B$, were used in the calculations. FIG. 6 shows a plot of the recognition rate vs total number of neural network parameters.

Speech Recognition Experiment 2

The procedure and database used in speech recognition Experiment 2 were identical to those described in Experiment 1, except that only 4 characteristic parameters, i.e., $x_i$'s, that were closest to $a_j$ were used in the calculations. The recognition rate vs total number of parameters for speech recognition Experiment 2 are also shown in FIG. 6. Very little difference was observed between these experiments. This manifests one of the main advantages of the method disclosed in the present invention, i.e., it can substantially reduce the number of neural network parameters without affecting the recognition rate.

Comparative Speech Recognition Experiment

The Comparative Example utilized the same parameters as the Examples above, but a different method, Multi-Layer Perceptions QNLP) method used to construct the neural network. Detailed descriptions of the MLP method can be found in "An Introduction to Computing With Neural Nets," by R. P. Lipmann, IEEE Acoustics, Speech and Signal Processing Magazine, Vol. 4, No. 2, pp. 4–22 (1987). The recognition results as a function of total number of parameters is shown in FIG. 6. The advantage of the present invention, especially at small number of total parameters, can be clearly established by comparing results obtained from these three experiments.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for speech recognition comprising the steps of:
   (a) dividing a speech signal into N number of timeframes;
   (b) processing each timeframe into B number of characteristic parameters via a plurality of bandpass filters; and
   (c) processing said characteristic parameters through a neural network, wherein:
      (i) said neural network comprises an input layer, a hidden layer, and an output layer, each of said layers comprising a plurality of nodal points;
      (ii) each of said nodal points in said input layer is represented by one of said characteristic parameters;
      (iii) each of said nodal points in said hidden layer is calculated from a plurality of nodal points in said input layer utilizing a set of first weighting coefficients;
      (iv) each of said nodal points in said output layer is calculated from a plurality of nodal points in said hidden layer utilizing a set of second weighting coefficients; and
      (v) further wherein each of said first weighting coefficients is a function of at least one of said nodal points in said hidden layer and at least one of said nodal points in said input layer, and each of said second weighting coefficients is a function of time and at least one of said nodal points in said output layer; and
   (d) selecting a word or a group or words corresponding to the output nodal point with the largest output over the timeframes.

2. The method of speech recognition according to claim 1 wherein each of said nodal points in said hidden layer during timeframe n, $Y_n[j]$, is calculated according to the following formula:

$$Y_n[j] = \text{sigmoid}\left( \sum_{i=1}^{B'} x_i w_j'[i] + \theta_j \right)$$

wherein $x_i$ is the characteristic parameter representing nodal point i in the input layer, $w_j'[i]$ is a first weighting coefficient between nodal point j in the hidden layer and nodal point i in the input layer; B' is an integer such that $B' \leq B$; $\theta_j$ is a training coefficient associated with nodal point j, and sigmoid(x) is represented by the following formula:

$$\text{sigmoid}(x) = \frac{1}{1 + e^{-x}}$$

3. The method of speech recognition according to claim 2 wherein said first weighting coefficient is calculated according to the formula:

$$w_j'[i] = \frac{c_j}{\sqrt{2\pi} \; b_j} e^{-\frac{1}{2}\left(\frac{i-a_j}{b_j}\right)^2}$$

wherein said $a_j$, $b_j$, and $c_j$ are all training coefficients associated with nodal point j.

4. The method of speech recognition according to claim 1 wherein each of said nodal points in said output layer during timeframe n, $Z_n[k]$, is calculated according to the following formula:

$$Z_n[k] = \text{sigmoid}\left( \sum_{j=1}^{H} Y_n[j] w_{jk}''\left[\frac{n}{N}\right] \right)$$

wherein H is the number of nodal points in said hidden layer, $W_{jk}''[n/N]$ is a second weighting coefficient between nodal point j in said hidden layer and nodal point k in said output layer at time frame n, and sigmoid(x) is represented by the following formula;

$$\text{sigmoid}(x) = \frac{1}{1 + e^{-x}}$$

5. The method of speech recognition according to claim 4 wherein said second weighting coefficient is calculated according to the formula:

$$w_{jk}''\left[\frac{n}{N}\right] = \sum_{m=0}^{r} \alpha_{jkm} \psi_m\left(\frac{n}{N}\right)$$

wherein r is the order of an orthogonal polynomial series $\psi$, $\alpha_{jkm}$ is the m-th order training coefficient between nodal points j and k.

6. The method of speech recognition according to claim 5 wherein r=2 and said polynomial $\psi$ is represented by the following formulas:

$$\psi_0\left(\frac{n}{N}\right) = 1$$

$$\psi_1\left(\frac{n}{N}\right) = \left[\frac{12N}{N+2}\right]^{1/2} \left[\frac{n}{N} - \frac{1}{2}\right]$$

and $$\psi_2\left(\frac{n}{N}\right) = \left[\frac{180N^3}{(N-1)(N+2)(N+3)}\right]^{1/2} \left[\left(\frac{n}{N}\right)^2 - \frac{n}{N} + \frac{N-1}{6N}\right].$$

7. A device for speech recognition comprising:
   (a) means for dividing a speech signal into N number of timeframes;
   (b) means for processing each timeframe into B number of characteristic parameters via a plurality of bandpass filters; and (c) a neural network for processing said characteristic parameters through, wherein:
  (i) said neural network comprises an input layer, a hidden layer, and an output layer, each of said layers comprising a plurality of nodal points;
  (ii) each of said nodal points in said input layer is represented by one of said characteristic parameters;
  (iii) each of said nodal points in said hidden layer is calculated from a plurality of nodal points in said input layer utilizing a set of first weighting coefficients;
  (iv) each of said nodal points in said output layer is calculated from a plurality of nodal points in said hidden layer utilizing a set of second weighting coefficients; and
  (v) further wherein each of said first weighting coefficients is a function of at least one of said nodal points in said hidden layer and at least one of said nodal points in said input layer, and each of said second weighting coefficients is a function of time and at least one of said nodal points in said output layer; and
(d) means for selecting a word or a group of words corresponding to the output nodal point with the largest output over the timeframes.

8. The device for speech recognition according to claim 7 wherein each of said nodal points in said hidden layer during timeframe n, $Y_n[j]$, is calculated according to the following formula:

$$Y_n[j] = sigmoid\left( \sum_{i=1}^{B'} x_i w_j^I[i] + \theta_j \right)$$

wherein $x_i$ is the characteristic parameter representing nodal point i in the input layer, $w_j^I[i]$ is a first weighting coefficient between nodal point j in the hidden layer and nodal point i in the input layer; B' is an integer such that $B' \leq B$; $\theta_j$ is a training coefficient associated with nodal point j, and sigmoid(x) is represented by the following formula:

$$sigmoid(x) = \frac{1}{1+e^{-x}}.$$

9. The device for speech recognition according to claim 8 wherein said first weighting coefficient is calculated according to the formula:

$$w_j^I[i] = \frac{c_j}{\sqrt{2\pi} \; b_j} e^{-\frac{1}{2}(\frac{i-a_j}{b_j})^2}$$

wherein said $a_j$, $b_j$, and $c_j$ are all training coefficients associated with nodal point j.

10. The device speech recognition according to claim 7, wherein each of said nodal points in said output layer during timeframe n, $Z_n[k]$, is calculated according to the following formula:

$$Z_n[k] = sigmoid\left( \sum_{j=1}^{H} Y_n[j] w_{jk}^{II}\left[\frac{n}{N}\right] \right)$$

wherein H is the number of nodal points in said hidden layer; $w_{jk}^{II}[N]$ is a second weighting coefficient between nodal point j in said hidden layer and nodal point k in said output layer at time frame n, and sigmoid(x) is represented by the following formula:

$$sigmoid(x) = \frac{1}{1+e^{-x}}.$$

11. The device for speech recognition according to claim 10 wherein said second weighting coefficient is calculated according to the formula:

$$w_{jk}^{II}\left[\frac{n}{N}\right] = \sum_{m=0}^{r} \alpha_{jkm} \phi_m\left(\frac{n}{N}\right)$$

wherein r is the order of an orthogonal polynomial series $\psi$, $\alpha_{jkm}$ is the m-th order training coefficient between nodal points j and k.

12. The device for speech recognition according to claim 11 wherein r=2 and said polynomial $\psi$ is represented by the following formulas:

$$\phi_0\left(\frac{n}{N}\right) = 1$$

$$\phi_1\left(\frac{n}{N}\right) = \left[\frac{12N}{N+2}\right]^{1/2} \left[\frac{n}{N} - \frac{1}{2}\right]$$

and $$\phi_2\left(\frac{n}{N}\right) = \left[\frac{180N^3}{(N-1)(N+2)(N+3)}\right]^{1/2} \left[\left(\frac{n}{N}\right)^2 - \frac{n}{N} + \frac{N-1}{6N}\right].$$

13. A device for speech recognition comprising:
(a) means for dividing a speech signal into N number of timeframes;
(b) means for processing each timeframe into B number of characteristic parameters via a plurality of bandpass filters; and
(c) a neural network for processing said characteristic parameters through, wherein:
  (i) said neural network comprises an input layer, a hidden layer, and an output layer, each of said layers comprising a plurality of nodal points;
  (ii) each of said nodal points in said input layer is represented by one of said characteristic parameters;
  (iii) each of said nodal points in said hidden layer is calculated from a plurality of nodal points in said input layer utilizing a set of first weighting coefficients;
  (iv) each of said nodal points in said output layer is calculated from a plurality of nodal points in said hidden layer utilizing a set of second weighting coefficients; further wherein
(d) each of said nodal points in said hidden layer during timeframe n, $Y_n[J]$, is calculated according to the following formulas:

$$Y_n[j] = sigmoid\left( \sum_{i=1}^{B'} x_i w_j^I[i] + \theta_j \right)$$

$$w_j^I[i] = \frac{c_j}{\sqrt{2\pi} \; b_j} e^{-\frac{1}{2}(\frac{i...a_j}{b_j})^2}$$

-continued $$sigmoid(x) = \frac{1}{1+e^{-x}}$$

wherein $x_i$ is the characteristic parameter representing the nodal point i in the input layer; $w_j^i[i]$ is a first weighting coefficient between nodal point j in the hidden layer and nodal point i in the input layer. B' is an integer such that B'≦B; and $a_j$, $b_j$, $c_j$ and $\theta_j$ are training coefficients associated with nodal point j; and (e) each of said nodal points in said output layer during timeframe n, $Z_n[k]$, is calculated according to the following formulas:

$$Z_n[k] = sigmoid\left(\sum_{j=1}^{H} Y_n[j]w_{jk}^{II}\left[\frac{n}{N}\right]\right)$$

$$w_{jk}^{II}\left[\frac{n}{N}\right] = \sum_{m=0}^{r} \alpha_{jkm}\phi_m\left(\frac{n}{N}\right)$$

wherein H is the number of nodal points in said hidden layer, $w_{jk}^{II}[n/N]$ is a second weighting coefficient between nodal point j in said hidden layer and nodal point k in said output layer at time frame n, r is the order of an orthogonal polynomial series $\psi$, $\alpha_{jkm}$ is the m-th order training coefficient between nodal points j and k; and (f) means for selecting a word or a group of words corresponding to the output nodal point with the largest output over the timeframes.

14. The device for speech recognition according to claim 13 wherein r=2 and said polynomial $\psi$ is represented by the following formulas:

$$\phi_0\left(\frac{n}{N}\right) = 1$$

$$\phi_1\left(\frac{n}{N}\right) = \left[\frac{12N}{N+2}\right]^{1/2}\left[\frac{n}{N} - \frac{1}{2}\right]$$

and $$\phi_2\left(\frac{n}{N}\right) =$$

$$\left[\frac{180N^3}{(N-1)(N+2)(N+3)}\right]^{1/2}\left[\left(\frac{n}{N}\right)^2 - \frac{n}{N} + \frac{N-1}{6N}\right].$$

15. The device of speech recognition according to claim 13 wherein 4≦B'≦B.

16. The device of speech recognition according to claim 13 wherein said training coefficients $a_j$, $b_j$, $c_j$, $\theta_j$ and $\alpha_{jkm}$ are obtained using a generalized probabilistic descent (GPD) algorithm.

* * * * *